United States Patent [19]

Bush

[11] 4,272,299

[45] Jun. 9, 1981

[54] BURNT SUGAR CARAMEL FLAVORING AND PROCESS OF MAKING

[76] Inventor: Hazel S. Bush, Rte. 1, Box 78, Newton, Ga. 31770

[21] Appl. No.: 133,257

[22] Filed: Mar. 24, 1980

[51] Int. Cl.³ .......................... A23L 1/09; A23L 1/22
[52] U.S. Cl. ........................................ 127/29; 127/30; 127/34; 426/533; 426/654; 426/658
[58] Field of Search ............................ 127/29, 34, 30; 426/533, 534, 654, 658

[56] References Cited

U.S. PATENT DOCUMENTS

| | | |
|---|---|---|
| 2,069,064 | 1/1937 | Gore . |
| 2,201,609 | 5/1940 | Dale . |
| 2,294,552 | 12/1966 | Topalian . |
| 2,435,249 | 2/1948 | Zenzes . |
| 2,487,121 | 11/1949 | Fetzer . |
| 2,537,192 | 1/1951 | Sebring . |
| 2,668,128 | 2/1954 | Oxnard ............................. 127/34 X |
| 2,902,393 | 9/1959 | Meyer ................................. 127/34 |
| 3,385,733 | 5/1968 | Ackermann ............................ 127/34 |
| 3,622,343 | 11/1971 | Anwar ............................. 426/654 X |
| 3,658,557 | 4/1972 | Samejima ........................ 426/654 X |

OTHER PUBLICATIONS

Chemical Abstracts, 51:18383b, (1957).

*Primary Examiner*—Sidney Marantz
*Attorney, Agent, or Firm*—Newton, Hopkins & Ormsby

[57] ABSTRACT

A burnt sugar instant caramel flavoring in syrup form storable at room temperature consisting of a mixture of approximately five parts by volume of a sugar base holding syrup and three parts by volume of a burnt sugar caramel flavored syrup. The holding syrup contains granulated sugar, water, corn syrup and liquid glucose.

6 Claims, No Drawings

BURNT SUGAR CARAMEL FLAVORING AND PROCESS OF MAKING

BACKGROUND OF THE INVENTION

Historically, caramel flavoring for confections has been derived from burning granulated sugar and the resulting flavoring in syrup form required almost immediate use to avoid crystallization of the product, foaming and the development of mold. Since no completely satisfactory method of preserving the burnt sugar caramel flavoring has been available, much of the product has been simply cast aside and wasted in the prior art.

As a result of this difficulty, most home and commercial users of the flavoring have simply abandoned its use in the traditional form of burnt sugar syrup and have substituted in its place commercial brown sugar, as a matter of convenience, and because it resembles to some degree the traditional product, but in actuality is a poor substitute.

The objective of this invention is to provide an instantly available, natural, burnt sugar caramel flavoring in syrup form which can be stored for relatively long periods of time at room or pantry temperatures without chemical preservatives and can be used in numerous confections which require caramel flavoring.

In accordance with the invention, the burnt sugar flavoring is formed as a syrup generally in accordance with traditional practice and a holding syrup which acts as a preservative is separately formed. The two syrups are then blended and, while still warm, are sealed in glass jars and stored prior to use like other commercial syrups and many other products having chemical preservatives. The blended flavoring is available instantly for use in a variety of recipes without the pitfalls and problems of the prior art.

Other features and advantages of the invention will become apparent during the course of the following description.

DETAILED DESCRIPTION

A burnt sugar caramel flavoring in storable syrup form for use in confections of various kinds is made according to the following process:

According to a first step of the process the holding syrup is produced as follows:

In a large 4 quart aluminum saucepan, the following ingredients are mixed together:

2 cups extra fine granulated sugar
2 cups tap water
1 cup Karo syrup
2 teaspoons liquid glucose Attach candy thermometer inside saucepan and bring ingredients to a boil on medium heat, stirring occasionally around edges to clear off crystals. Continue boiling until the syrup reaches 225° F., cut off heat, and the holding syrup is ready for blending with burnt sugar caramel flavoring.

In a second step, a burnt sugar flavoring syrup is produced as follows:

In a medium 2 quart aluminum saucepan, place 2 cups of extra fine granulated sugar and attach candy thermometer in saucepan. Cook on medium-low heat while pushing sugar around in saucepan slowly until it completely melts and temperature reaches 250° F. After this stage of cooking, the temperature will increase very rapidly, and when it reaches 300° F., remove saucepan from heat instantly and add 1 cup of tap water. Some crystals will now form. Stir product slowly for 1 minute away from heat and return to heat and continue to stir until all visible crystals are dissolved, usually requiring about 5 minutes. Cut off heat and then blend the burnt sugar caramel flavoring syrup into the holding syrup produced under Step (1) and seal the resulting mixture in conventional mason jars or the like while still warm and store on shelf until ready for use in various confections.

Preferably, the holding syrup under Step (1) is mixed on the heat (225° F.) about 10 minutes before the burnt sugar under Step (2) is put on the heat. Both components should be cooking at the same time, and when the required temperatures under the two steps are reached, the two syrups are then blended. The yield in the stated embodiment will be 32 ounces.

1 cup of the syrup flavoring produced will be equal to 1 cup of granulated sugar plus pure caramel extract commonly used in confectionary recipes.

The product makes available an instant old-fashioned natural burnt sugar caramel flavoring which will not crystallize during storage or use, will not foam, and will not develop mold. It retains virtually all of the desirable qualities of the traditional flavoring without the pitfalls and the resulting waste of the prior art.

It is to be understood that the form of the invention herewith described is to be taken as a preferred example of the same, and that various changes may be resorted to, without departing from the spirit of the invention or scope of the subjoined claims.

I claim:

1. A burnt sugar instant caramel flavoring in syrup form storable at room temperature consisting of a mixture of approximately five parts by volume of a sugar base holding syrup and three parts, by volume of a burnt sugar caramel flavored syrup.

2. A burnt sugar instant caramel flavoring as defined in claim 1 wherein the holding syrup contains approximately equal parts by volume of granulated sugar and water, a volume of corn syrup approximately equal to one-half the volume of water used and a small quantity of liquid glucose.

3. A burnt sugar instant caramel flavoring as defined in claim 2, wherein said burnt sugar caramel-flavored syrup contains approximately two parts by volume of granulated sugar and one part by volume of water.

4. A process for making a burnt sugar instant caramel flavoring in syrup form storable at room temperature comprising preparing substantially simultaneously five parts by volume of a sugar base holding syrup and three parts by volume of a burnt sugar caramel-flavored syrup and blending the two syrups together while hot and storing in jars at room temperature.

5. The process of claim 4, wherein said holding syrup is heated to a temperature of approximately 225° F. and said burnt sugar caramel-flavored syrup is heated to a temperature of approximately 300° F. prior to blending the two syrups.

6. The process of claim 5, wherein the two syrups contain substantial parts by volume of water.

* * * * *